Dec. 22, 1970  W. E. YOUNG  3,548,561
METHOD FOR FORMING A SEALED VACUUM PACKAGE
Original Filed Nov. 18, 1964  2 Sheets-Sheet 2
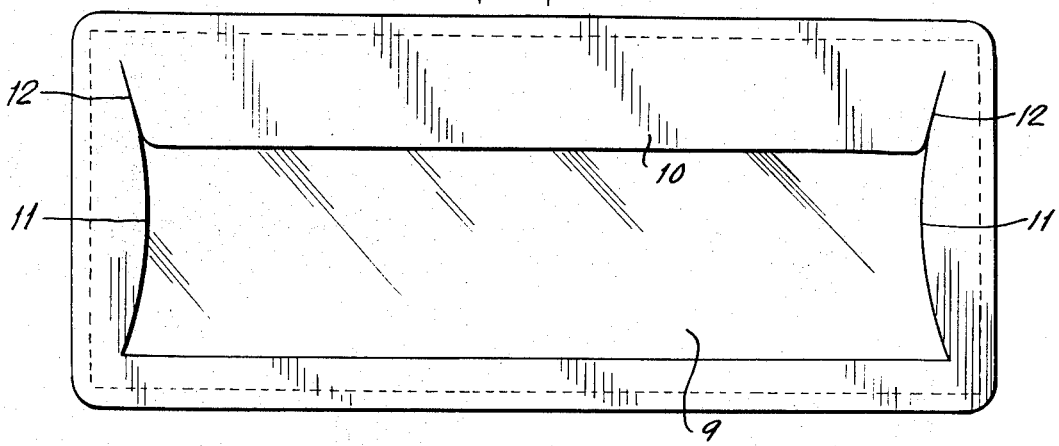
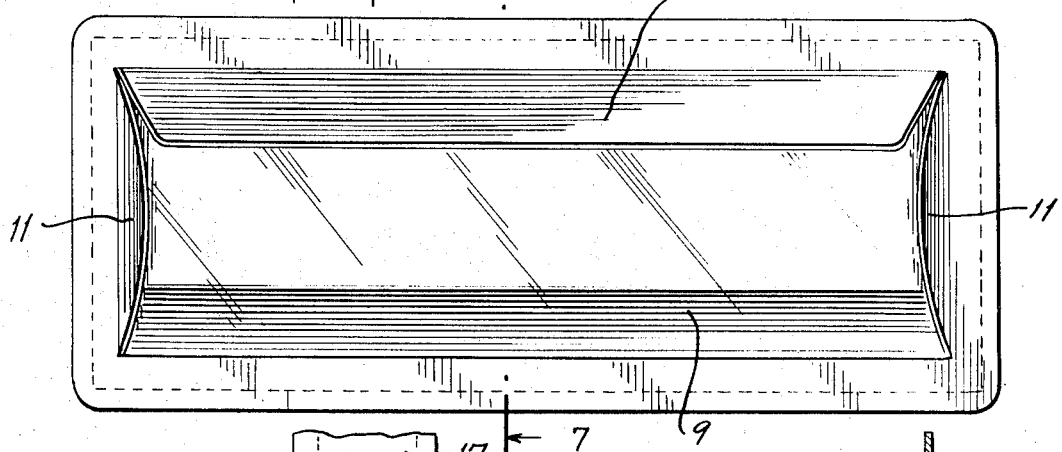
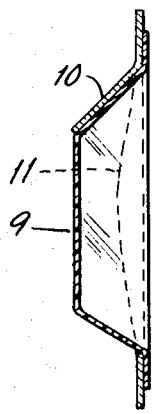
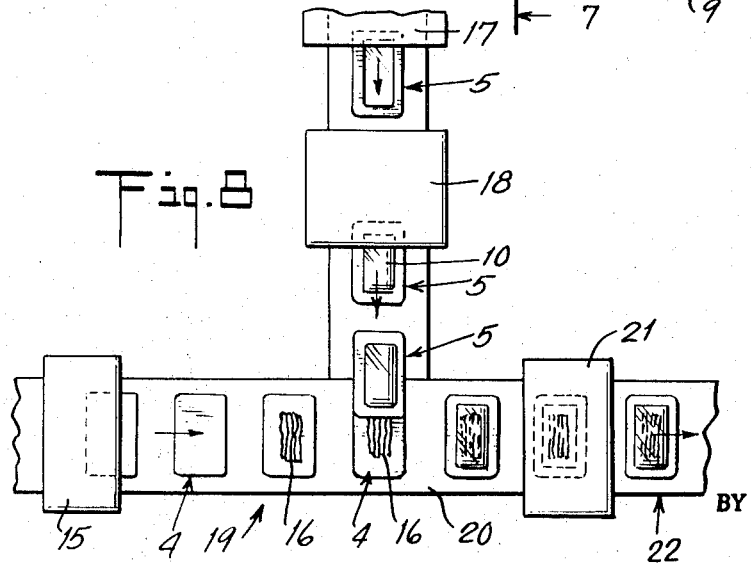
INVENTOR.
WILLIAM E. YOUNG
BY
ATTORNEYS 3,548,561
METHOD FOR FORMING A SEALED
VACUUM PACKAGE
William E. Young, 52 Sea Beach Drive,
Stamford, Conn. 06902
Continuation-in-part of application Ser. No. 650,038, June 29, 1967, which is a division of application Ser. No. 412,063, Nov. 18, 1964. This application Dec. 22, 1967, Ser. No. 695,826
Int. Cl. B65b 31/02
U.S. Cl. 53—22          18 Claims

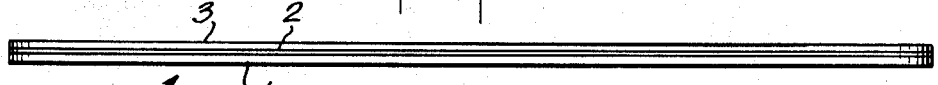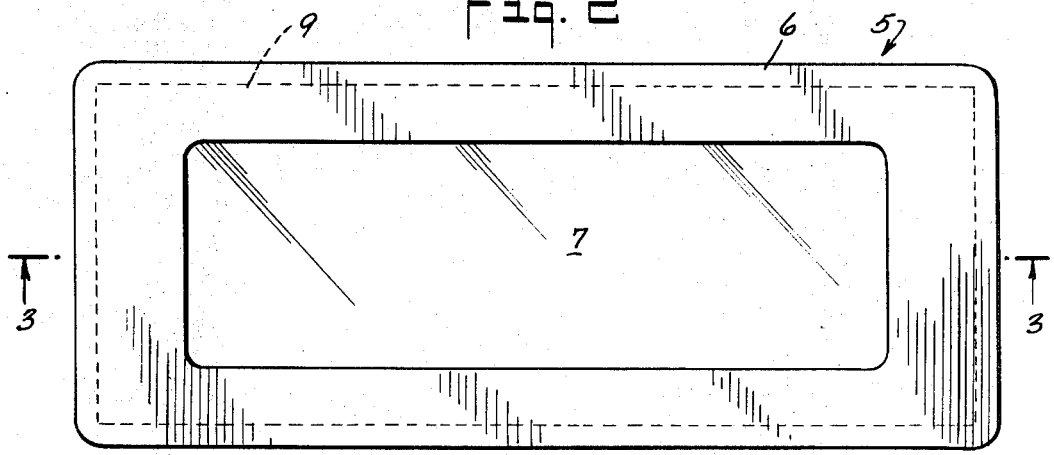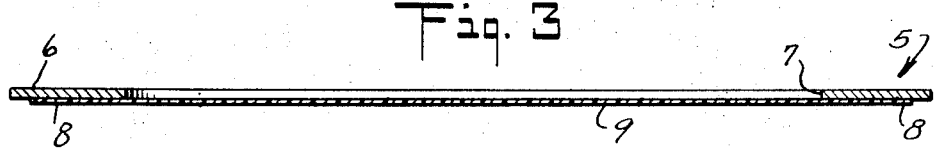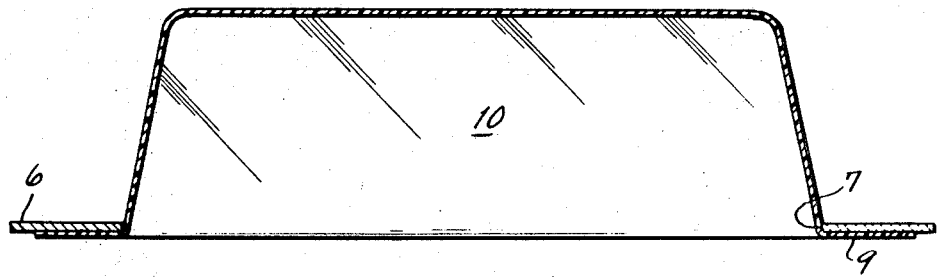

ABSTRACT OF THE DISCLOSURE

The method utilizes the steps of maintaining thin flimsy barrier films flat, smooth and unwrinkled while air is evacuated from between the films so that the films can then be sealed together to form a vacuum package. At least one of the barrier films is stretch-formed into a cup portion to receive food stuffs.

---

This application is a continuation-in-part of copending application Ser. No. 650,038, filed June 29, 1967 which is a division of copending application Ser. No. 412,063, filed Nov. 18, 1964, and reference made to copending application Ser. No. 662,838, filed June 29, 1967, all, now abandoned, pursuant to a requirement of restriction made by the Patent Office in Ser. No. 412,063.

This invention relates to a method for sealing a product and particularly food stuffs within a vacuum package. More particularly, the invention includes a method of producing a vacuum package by forming a seal around the periphery of top and bottom package portions through the steps of affixing top and bottom barrier film portions to rigid supports and thereafter using said rigid supports to hold the barrier film in position during forming of a film portion, during evacuation of the package area, during the subsequent closing of the package, while a seal is effected between the films.

Vacuum packaging of cheese, processed meats and other items is a generally well-developed art. According to one general practice, the vacuum packages are formed of a top and a bottom piece, each of which includes or comprises a plastic film barrier. One of these pieces is typically preformed into a cup to receive the food stuff or simply draped over and then tucked around the food stuff. The outer circumference and perimeter areas of these top and bottom pieces are then placed opposite to one another and the air evacuated from between them. The circumference areas are then pressed together and a seal formed. One problem has been to position and maintain the circumference area of one thin film in a flat, aligned and wrinkle-free condition next to the other film or support during the period in which sealing is effected.

The difficulty of holding the film wrinkle-free during forming of a film and during the evacuation of air within the package to an absolute pressure of 5–25 mm. Hg can be appreciated when it is realized that the sheets of film are only about .002–.003 inch thick. The present solution of this problem is to provide packaging equipment which has means for positioning the barrier film without wrinkling and then holding it in this position during forming, evacuation and during the subsequent closing of the package halves and sealing. In practice, these means are complicated and expensive.

Moreover, the present vacuum packaging means are not completely reliable in achieving a tight seal around the entire circumference of the vacuum package. It is of the utmost importance to form a perfect seal since even a minute opening will allow air to leak in and cause the packaged food stuffs to deteriorate. This presents a health hazard since there is a risk that this deterioration will be undetected in the home before the food stuffs are consumed. Even in those cases for which the deterioration is detected, there is an unfavorable consumer reaction which makes it important to the manufacturer to insure that a perfect seal is obtained every time.

It is also important to protect the film which is formed into a pocket position for enclosing food stuffs particularly at the juncture of the pocket with the flat edge portion of the package so that the film is not torn or cracked at this juncture, either during forming or in the flexing inherent in subsequent handling.

In brief summary and according to one example of the present invention, a bottom package portion is made of paperboard covered with a barrier material that may be adhered either as a coating or as a film lamina.

In view of the present disclosure it will be apparent to men skilled in the art that any rigid support material, such as, for an example, a self-supporting plastic, may be used as the equivalent of paperboard, either covered with or comprising a barrier material.

A top package portion includes a paperboard having an opening in its central portion. A barrier film is placed over the opening and adhered to the paperboard circumference area around the opening. The barrier film is applied in a flat sheet as from a roll to the flat paperboard, and a smooth flat circumference area of the film is thus achieved and maintained by the paperboard support. The barrier film may be thermally stretch-formed or stretch-formed in the absence of heat through the central opening of the paperboard to form a cup portion to eventually receive the food stuff to be packaged. Rounded bearing surfaces are desirably provided about the edges of the central opening to gradually curve the barrier film through the opening without cut or snag, and to protect it in this area thereafter. The paperboard adhered to the circumference of the film will maintain the barrier film in a smooth, unwrinkled condition during this forming and afterwards while the film is being transported, positioned and held for sealing against the circumference area of the bottom barrier material.

The invention provides a simple and reliable method for vacuum packaging. The method is capable of being practiced by relatively simple vacuum packaging equipment which does not have to provide any means for positioning and holding a flimsy piece of barrier film in a flat and unwrinkled position around its circumference area while at the same time evacuating the air from within the film and past this circumference area.

By means of the invention, it is feasible to evacuate air from the package past all four sides simultaneously and to then seal the four sides simultaneously. The desirability of this simultaneous four-sided evacuation and sealing has been suggested in the past but the difficulties of maintaining the film in an aligned and unwrinkled condition have heretofore made it practically impossible to achieve these advantages in actual commercial operation.

Further objects will be apparent from the following detailed description and drawings in which FIG. 1 is a front elevation of a bottom package portion;

FIG. 2 is a plan view of a top package portion;

FIG. 3 is a front sectional elevation taken generally along line 3—3 in FIG. 2;

FIG. 4 is a front sectional elevation of a top package portion after it has been preformed;

FIG. 5 is a plan view of an alternative top package portion;

FIG. 6 is a plan view of the alternative top package portion shown in FIG. 5 after it has been preformed;

FIG. 7 is an end sectional elevation of the alternative top package portion after it has been preformed; and FIG. 8 is a schematic drawing of method steps according to the invention and as they may be practiced by a machine.

The invention may be practiced in the following manner. For convenience of reference, the two package portions will be arbitrarily referred to as top and bottom package portions.

A bottom piece for the package is prepared with a relatively stiff board layer 1 dimensioned to the approximate size of the finished package. This rigid board may be made of paperboard or any other non-toxic and suitable material may serve as an equivalent. The board is rigid as compared to a plastic barrier film but it should be understood that it may be flexible as compared, for example, to heavy cardboard.

A barrier film 2 is adhered to the paperboard over one surface thereof. This barrier film may be laminated or coated on the board and it may be made of a material such as vinylidene chloride, aluminum foil, or other material such as nylon having sufficient barrier properties to serve in preserving the particular food stuff or other material to be packaged. If the barrier material film is laminated to the board rather than applied as a coating, it may be affixed to the paperboard with a solvent or other type of liquid adhesive. A sealant or adhesive material 3 is applied over the barrier element 2 by any convenient method. This sealant material is required only about the outer circumference area of the bottom barrier film but for convenience the entire bottom area may be covered with a laminated or coated layer of sealant material such as polyethylene. It should be understood that if a barrier film is used which itself has, or includes a lamination which has, sealant properties, it is unnecessary to apply a separate sealant layer. In view of the teaching of this application, it will be apparent to men skilled in the art that other equivalent construction can be used for this bottom piece.

A blank 5 for the top piece of the vacuum package is prepared with a rigid board 6 having an outer circumference portion with a central opening 7. This board may be made of the same material as that used for bottom package portion or it may be made of a different and, for example, a lighter or heavier piece of material. This top board may also be dimensioned to the approximate size of the finished package. A barrier film 9 is juxtaposed and passed over the opening 7 and adhered to this paperboard support. The barrier film may be adhered or glued to the paperboard only in the circumference area adjacent to its outer periphery 8 which is to form the seal and need not be adhered to the board immediately adjacent to the opening 7. This barrier film 9 may be constructed of a substrate of nylon, polyester or other formable material. If the food stuffs to be packaged require a better barrier, the film 9 may include a coating or lamina of a material such as saran which may be on the side of the film away from the board. The film 9 may optionally carry a sealant coating of a material such as polyethylene. The barrier film 9 need not extend to the outer perimeter of the paperboard 6 but may be set back from the edge for economy in the use of the film material. The barrier film material 9 may also be used as the film for the bottom package portion but it may be preferable to use a cheaper barrier coating since the bottom board may serve as a substrate.

It has been found that the barrier film portion of the package blank prepared as described may be preformed with conventional vacuum and heat forming equipment so that the barrier film 9 forms a cup portion 10 that extends through the paperboard support opposite to the side to which the film is adhered, as shown in FIG. 4. It is to be understood that a preformed piece may also be used for the bottom package portion.

According to another embodiment of the invention, the paperboard 6 for the blank to be used in making the package top piece may be formed as shown in FIG. 5 with a side flap portion 10 and end flap portions 11. Alternatively, flap portions may be used on all four sides.

The flaps 10 and 11 provide additional stiffening and support for the paperboard piece 6 during its handling and they make possible a serviceably rigid construction of that piece with a smaller outer circumference edge portion than would otherwise be feasible with lightweight paperboard. This, in turn, achieves a more compact package. The flaps are set at an angle to the circumference edge when the barrier film is formed into a cup and then function adjacent the cup portion to help support it.

It is a further development and part of this invention to provide a rounded bearing surface along the edges of the opening of the top support member portion on the side toward the barrier film. This rounded surface can be provided by various manufacturing techniques, but according to a preferred teaching of this invention, the rounded edge is formed not only on the edge but also for a short distance on opposite sides of the edge by bending of a flap which extends into the opening and which is integral with the top support member upwardly. When this flap is formed of paperboard or equivalent material, the flexing takes place in the area of the juncture and also extends slightly past the juncture in each direction so that the radius of curvature of the bearing surface is actually larger than the radius of curvature which could be provided within the thickness of the paperboard support without the use of flaps. Moreover, the radius of curvature is flared slightly at each end. Preferably, this curved bearing surface is provided along each edge so that it will protect the barrier film from being torn during handling or flexing of the finished package or product. It is particularly important that the curved bearing surface be provided along each edge past which the barrier film is formed as the forming of the barrier film past such edges is particularly critical. According to one embodiment, the rounded bearing surface is provided about the entire sides of the opening on all the edge surfaces and the pocket in the barrier film is formed by pulling the barrier film material uniformly past and by these edges. Alternatively, it is possible to form the pocket by flexing the barrier film most against such edges as are provided with a rounded bearing surface, and leaving the less critical areas of the edge exposed.

In other words, it is to be understood that as the flaps are bent during formation of the cup, they provide a rounded edge about which the barrier film can be formed. The flap material at the junction of the flaps and the remainder of the board assumes a rounded shape in contrast to the sharp and often jagged edge left by conventional forming of openings, as by die-cutting. The rounded edges do not impede the formation of the barrier film into the cup as might a sharp edge nor is there tearing of the barrier film at the edge during forming. It should be understood that in heat forming, this critical edge portion—when the film is adjacent the paperboard support—is most difficult to head to the ideal temperature due to stretching of the film or in subsequent flexing as may be incurred during handling.

In order to facilitate the bending of the flaps during formation of the barrier film into a cup, and in order to satisfactorily bend small flaps, the flaps can be precreased along the line about which the flaps are bent.

Preferably, the barrier film that forms the cup portion next to the angled flaps 10 and 11 is adhered to the flaps for added strength and support. It is most convenient if this can be done before forming, when the flaps 10 and 11 are flat and the film 9 is adhered to the circumference edge portion of the similarly flat package piece 6. This method, however, encounters the problem that at least some portion of the film particularly in the vicinity of the ends of the flaps, must move relative to the rigid flaps during the forming of the cup. It is possible to adhere the film to the flaps only in an area set back from their ends, but this requires control and alignment of the area in which the adhesive is applied and it achieves only partial support of the cup portion in the finished package. For a preferable procedure, it has been found that the adhesive may be applied over the entire surface of the piece 6 without alignment if a heat sensitive vinyl emulsion type glue is used. This glue allows a satisfactory creep between flap and film as the cup portion is formed and thereafter provides good support between them.

Also, a glue or adhesive which is pressure sensitive can be used—i.e. a glue which will hold and support the film on the flap against those pressures encountered in handling but which, under the extraordinary pressure in forming, will "let go" and allow relative movement between film and flap. Further, any other glue or adhesive of a type which is relatively low in shear so as to permit relative sliding between flap and film can also be used.

It has been found possible to use glues or adhesives which do not allow the barrier film and flap to move with respect to each other during formation of the cup provided only one flap or two non-adjacent flaps are used. In this practice, it is the film which is not restrained against movement relative to the flap which is stretched to form the cup. Alternatively, in view of this teaching, it will be apparent to men skilled in the art that the flaps can be spaced apart from each other at their adjacent edges so that there is a gap between them which permits free deformation and stretching of the film during the forming of the pockets.

It is a further teaching of the invention to provide a burstable blank which is formed as described and of a paperboard piece 6 with flaps except that the joints 12 between the side and end flaps 10 and 11, respectively, are not cut entirely through but instead are partially cut or weakened to leave, for example, one or more narrow bridges of paperboard across the joints to connect the ends of the flaps together. Such a construction will provide greater and more rigid support to the blank during its handling and up to the time that the cup portion is preformed on the molding equipment. At this time, and under the pressure of the vacuum or other forming, it has been found that the ends will burst apart allowing the cup to be formed as though they had been separated from the beginning. As before, the barrier film may be adhered to the flaps 10, 11 an adequate distance back from the divisions 12 so that a free and unsupported portion of the film will be available for stretching between the flap ends when they separate as the cup portion is formed. Alternatively and according to a further teaching of the invention, a heat sensitive vinyl emulsion type glue may be used as described above.

One method for making packages, if the top and bottom package portions have been prepared as separate flat sheets according to one embodiment of the present invention, is shown schematically in FIG. 8. An advantage of carrying out this method with the bottom package portion being on the bottom and transported horizontally is that the food product can be maintained in position on this portion by gravity. By this method, a bottom package portion 4 is delivered to a loading area from storage means as shown at 15. The food stuff to be packaged and, for example, shingled bacon 16 is then placed on the central portion of this bottom piece as shown at 19.

A blank 5 for the top portion is supplied from a storage means or a magazine as shown at 17. The paperboard support member is used to position the film that passes under the opening 7 under a vacuum and stretch forming mold at 18 which forms cup portion 10 of film 9 upwardly through the paperboard opening. For the further inventions, the film is stretched or flowed past the rounded bearing surfaces provided, preferably by bent flaps. on the edges of the central opening, the molding heat softens a vinyl emulsion type glue to permit relative movement between the film and flaps during the forming process and molding pressure bursts paperboard flaps apart and sets them at an angle to the edge/portion of the package piece to form and provide support for a portion of the cup. This preformed top piece is then placed over the food stuff and onto the bottom piece as shown at 20. The words "top" and "bottom" are used illustratively; the "top" package portion could be formed on the bottom and receive the food stuff and the "bottom" package portion could be supplied on top.

Both package portions are then placed in a chamber at 21, the paperboard support being used to align and position the top and bottom barrier films opposite to one another. A tack seal may be made to hold the supports and film in aligned position for subsequent handling and during evacuation for final sealing. These seals should be made in as small an area as will serve this purpose so as to leave the substantial circumference of the package open for evacuation. The seals may, for example, be in two spot locations located in the middle of two opposite sides of the package, the seal being made, for example by pressing a spot heater bar against the paperboard support carrying the film barrier with sealant. Preferably, since any breaking of the tack seal prior to the peripheral sealing of the boards together may have a detrimental effect on the barrier properties of the film, the tack seal is made exteriorly to the inner limits of the peripheral seal. A tack seal allows the relative alignment of the top and bottom blanks to be subsequently maintained, for example, while the aligned blanks are handled prior to the peripheral sealing into a package. The chamber is evacuated and air is simultaneously drawn out from between the top and bottom package portions past each of the four sides to give an absolute pressure of between 5–25 mm. Hg within the chamber and package for most food products. After evacuation, an inert or preservative gas may be introduced into the package. It should be understood that this introduction of gas does not alter the basic method of packaging and reference to vacuum evacuation is intended to refer to and include not only vacuum evacuating but also vacuum evacuating and then gas-filling. The paperboard supports are then relied upon to hold the circumference areas of the barrier films smooth and flat while a seal is simultaneously made at the four sides within the vacuum chamber as by pressing a heater means against the paperboard support carrying the film barrier with sealant. The chamber is then opened and the completed package is delivered as at 22.

Further, in an alternative manner, the top and bottom supports can be tack sealed to each other prior to being placed in the chamber in order to maintain the relative positions of the supports during the evacuation of air.

While one method of making the package of the invention has been described above, it is noted that other methods can also be used to make the package. For example, where the top and bottom package blanks are prepared as above with a barrier film of a material which is stretch-formable without the application of heat, the use of heat forming equipment can be avoided in forming the package.

The invention has been described above for the production of top and bottom package portions of individual sheets of material. It is to be understood that in commercial practice, long sheets or rolls of paperboard and film may be laminated together to provide the package portions, each having a smoothly and evenly supported circumference area of barrier film material that will form the peripheral and circumferential seal areas in the finished package. After preparation, the long sheets and rolls are cut into lengths as is necessary so that one package portion may be positioned over the next package portion in manufacture of the separate packages.

The invention is further pointed out in the following claims.

I claim:

1. A method of making a vacuum package comprising the steps of providing a first individual gas barrier package portion with a product thereon, positioning a second individual package portion having a board support including an aperture therein and a barrier film adhered smoothly and evenly to one surface thereof across the aperture therein in alignment over said first package portion and the product thereon, forming the barrier film of said second package portion through said aperture in the paperboard support thereof and past the opposite side of said paperboard support to provide said second package portion with a cup portion, evacuating air from between said aligned packaged portions said barrier film being supported by said board support while air rushes past it, subsequently pressing said package portions together about the circumference areas thereof to bring said barrier film into intimate contact with said first package portion within said circumference areas, and sealing said barrier film and first package portion together at the contacting portion to form a vacuum package of said first and second package portions containing the product.

2. A method as set forth in claim 1 wherein said first package portion includes a paperboard support and a barrier film adhered to one surface thereof within the circumference area thereof, wherein the barrier film of each said package portion has a heat sealable periphery within said circumference areas and wherein said step of sealing includes the heating of said heat sealable peripheries to form a seal between said barrier films.

3. A method as set for in claim 1 which further comprises the step of introducing an inert gas between said package portions immediately before said steps of pressing and sealing.

4. A method as set forth in claim 1 wherein said second package portion has a rounded bearing surface on at least one side of said opening and which further comprises the step of moving said barrier film relative to said rounded bearing surface during forming of said barrier film.

5. A method as set forth in claim 1 wherein said first package portion includes a paperboard support and a barrier film adhered to a surface thereof within the circumference area thereof and wherein the barrier film of each said package portion has a heat sealable periphery within said circumference areas and wherein said step of sealing includes the heating of said heat sealable peripheries to form an airtight seal between said barrier films.

6. A method as set forth in claim 1 which further comprises the step of adhering a barrier film to a paperboard support in a smooth evenly supported manner about the circumference area of said paperboard support to form said first package portion.

7. A method as set forth in claim 1 wherein said step of evacuating comprises the steps of placing said package portions in a chamber and evacuating air from said chamber, the air being free to rush out from within and between the package portions about the substantial portion of the peripheries thereof while said barrier film is held against the rush of evacuating air past it by said board support to which it is adhered.

8. A method as set forth in claim 1 wherein air is evacuated past substantial portions of each peripheral side of said package portions during said step of evacuation.

9. In a method of making a package with a first package blank having a barrier coating applied across a surface of a first board support which comprises the steps of preparing a second package blank with a second board support including an aperture therein, adhering a thin flexible stretchable barrier film to the second board support in a smooth and evenly supported manner about the circumference area surrounding the aperture thereof, forming a portion of the film through the aperture of the second board support to form a cup portion, placing a food product on the barrier coated surface of the first board support, aligning the second board support over the first board support in a manner so that the cup portion of the barrier film is disposed about the food product and so that the peripheral areas of the barrier film and the barrier coating are placed next to each other, thereafter evacuating air from between the first and second package blanks, and subsequently sealing the barrier film and barrier coating together about the peripheral areas thereof to form a gas-tight package of the package blanks containing the food product.

10. A method of making a gas-tight package comprising the steps of providing a first individual gas barrier package portion with a product thereon, positioning a second individual package portion having a board support including an aperture therein and a rounded bearing surface on at least one side of said aperture and a barrier film adhered smoothly and evenly to one surface of said support, forming a cup portion in said barrier film to project through the aperture in alignment over said first package portion and the product thereon while moving said barrier film relative to said rounded bearing surface during forming of said cup portion to protect said barrier film against tearing, evacuating air from between said aligned package portions with said barrier film being supported on said board support while air rushes past said barrier film, subsequently pressing said package portions together about the circumference areas thereof to bring said barrier film into intimate contact with said first package portion within said circumference areas, and sealing said barrier film and first package portion together at the contacting portions to form a gas tight package of said first and second package portions containing the product.

11. A method of making a gas-tight package comprising the steps of providing a first individual gas barrier package portion with a product thereon, positioning a second individual package portion having a board support including an aperture therein, a flap along at least one part of the inner circumference defining said aperture and a barrier film adhered smoothly and evenly to one surface of said support and initially over said flap, forming a cup portion in said barrier film to project through the aperture in alignment over said first package portion and the product thereon while bending said flap out of the plane of said aperture, evacuating air from between said aligned package portions with said barrier film being supported on said board support while air rushes past said barrier film, subsequently pressing said package portions together about the circumference areas thereof to bring said barrier film into intimate contact with said first package portion within said circumference areas, and sealing said barrier film and first package portion together at the contacting portions to form a gas tight package of said first and second package portions containing the product.

12. A method as set forth in claim 1 wherein said second package portion includes at least two flaps extending from said inner circumference into said aperture, said flaps being burstably attached together at the adjacent ends thereof whereby said flaps impart a greater rigidity to said package portion prior to forming and which further includes the step of bursting said flaps apart during formation of said cup portion whereby said flaps impart a greater rigidity to said cup portion.

13. A method as set forth in claim 11 wherein a glue is positioned between said flap and barrier film on said second package portion to secure said flap and barrier film together, and which further comprises the step of subjecting said glue to heat during formation of said cup portion sufficient to permit relative sliding between said barrier film and flap.

14. A method as set forth in claim 13 wherein said glue is heat softenable.

15. A method as set forth in claim 11 wherein said second package portion includes a flap extending from each side into said aperture and being glued to said adjacent barrier film wherein each of said flaps bends out of the plane of said second package portion during formation of said cup portion while remaining in engagement with said cup portion to stiffen said cup portion.

16. A method as set forth in claim 15 wherein at least one of said flaps forms a rounded bearing surface with said top support at the juncture thereof during bending of said flap to protect said adjacent barrier film against tearing thereat.

17. A method as set forth in claim 15 wherein all of said flaps forms a rounded bearing surface with said top support.

18. A method as set forth in claim 15 which further comprises the step of stretching said barrier film in the area between the ends of said flaps during formation of said cup portion.

References Cited
UNITED STATES PATENTS

| | | | |
|---|---|---|---|
| 2,621,129 | 12/1952 | Ramsbottom et al. | 53—22UX |
| 2,991,600 | 7/1961 | Lancaster | 53—112X |
| 3,020,686 | 2/1962 | Rueckert et al. | 53—112X |
| 3,228,168 | 1/1966 | Grindrod et al. | 53—22X |

TRAVIS S. McGEHEE, Primary Examiner

UNITED STATES PATENT OFFICE
CERTIFICATE OF CORRECTION

Patent No. 3,548,561     Dated December 22, 1970

Inventor(s) William E. Young

It is certified that error appears in the above-identified patent and that said Letters Patent are hereby corrected as shown below:

Column 6, line 73, "provde" should be --provide--

Claim 12, line 1, change "1" to --11--

Signed and sealed this 25th day of May 1971.

(SEAL)
Attest:

EDWARD M. FLETCHER, JR.
Attesting Officer

WILLIAM E. SCHUYLER, JR.
Commissioner of Patents